United States Patent Office 3,845,156
Patented Oct. 29, 1974

3,845,156
PROCESSES FOR DEHYDROGENATION OF
ORGANIC COMPOUNDS
Floyd E. Farha, Jr., Bartlesville, Okla., assignor to
Phillips Petroleum Company
No Drawing. Filed Apr. 5, 1972, Ser. No. 241,399
Int. Cl. C07c 5/18
U.S. Cl. 260—680 E                                3 Claims

ABSTRACT OF THE DISCLOSURE

Product selectivities in catalytic oxidative dehydrogenation processes can be improved by effecting the reaction in the presence of small amounts of sulfur. The use of carbon disulfide with Li/Sn/P/O and K/Ni/Sn/P/O catalysts is shown.

This invention relates to chemical processes. More particularly, this invention relates to the dehydrogenation of organic compounds in the presence of free molecular oxygen.

The dehydrogenation of organic compounds, in particular, the oxidative dehydrogenation of hydrocarbons, is a useful and well-known method for converting saturated or partially saturated organic compounds to compounds containing a greater degree of unsaturation. The reaction is generally carried out at relatively severe conditions of elevated temperatures. Less than quantitative results are generally obtained, particularly when a high degree of dehydrogenation is required to obtain a specific product. For example, the dehydrogenation of butane directly to butadiene or the dehydrogenation of isopentane directly to isoprene leaves a great deal to be desired in regard to selectivity to the desired product.

Some catalysts are capable of efficient and selective operation, but are found to be active or selective for a relatively short time before they must be either regenerated or replaced. Conversely, some long-lived catalyst systems do not have the desired level of selectivity for most economical operation.

It is an object of this invention to provide processes for the catalytic dehydrogenation of organic compounds in the presence of oxygen.

It is another object of this invention to provide oxidative dehydrogenation processes characterized by improved selectivity to desired product and improved catalyst longevity.

Other aspects, objects and other advantages of the present invention will be readily apparent to those skilled in the art upon a reading of the specification and appended claims.

The present invention provides a process by which desired dehydrogenated products can be obtained with a greater selectivity. Further, the invention provides an oxidative dehydrogenation process which can be operated efficiently with a high degree of selectivity for greater periods of time before the catalyst need be regenerated and/or replaced.

In accordance with the present invention, it has been discovered that the selectivity of oxidative dehydrogenation catalyic system is improved and the active catalyst life during which the process operates at high selectivity is lengthened by introducing small amounts of sulfur or decomposable sulfur-containing compounds into the reaction zone with the organic feed stream.

Catalysts which can be used in the present oxidative dehydrogenation process are those calcined solid inorganic catalysts which have at least some promoting effect for the oxidative dehydrogenation of organic compounds, such as for the oxidative dehydrogenation of butenes to butadiene. Generally, these catalysts contain one or more metals selected from Groups IIIA, IVA, VA, IB, IIB, IIIB, IVB, VIB, VIIB and VIII of thhe Periodic Table of the elements. Particularly appropriate are catalysts which comprise calcined compositions corresponding to the following expressions:

Me/P/O or Ferrous Metal/Me'/O wherein Me is selected from one or more of the metals Fe, Co, Ni, Sn, Al, Pb, Mo, W, B, Cd, In, Mg, Th, Y, Cr, Cu, Ga, Re, Ti, Hg, Au, Nd, and Sc; wherein Ferrous Metal is selected from one or more of the ferrous metals Fe, Co, and Ni of Group VIII; and wherein Me' is selected from one or more of the metals Sn, Al, Pb, Mo, W, Zn, Ti, Mg, and U.

In those catalyst compositions characteried by the expression Me/P/O, the phosphorus can be present in any effective amount such as in the range of 0.1 to about 30 weight percent. In the catalyst compositions characteried by the expression Ferrous Metal/Me'/O, the ferrous metal and the Me' metal will each be present in effective amounts such as in the range of 0.1 to about 80 weight percent.

Optionally, these calcined solid composites can contain minor amounts, generally less than 10 weight percent and preferably less than 5 weight percent, of other elements which either modify the catalysts or which do not significantly impair the performance of the catalyst. Some of these elements are Li, Na, K, Rb, Cs, Be, Mg, Ca, Sr, Ba, S, As, Sb and Bi.

Some examples of suitable calcined solid compositions include:

| | |
|---|---|
| Sn/P/O | Co/Pb/P/O |
| Li/Sn/P/O | Co/Sn/P/O |
| Ni/Sn/P/O | Co/Sr/P/O |
| K/Ni/Sn/P/O | Co/Th/P/O |
| Al/Co/P/O | Co/Y/P/O |
| Al/Fe/O/O | Co/Pb/Mo/W/O |
| Al/P/O | Co/Sn/O |
| Al/Pb/Mo/W/O | Co/W/O |
| As/Ni/Sn/O | Cr/Sn/P/O |
| As/Ni/Sn/P/O | Fe/Ga/P/O |
| Au/Sn/P/O | Li/Fe/P/O |
| B/Co/P/O | K/Fe/P/O |
| B/Sn/P/O | Fe/Ni/Sb/O |
| Ba/Co/P/O | Fe/P/O |
| Ba/ni/Si/P/O | Fe/P/Re/O |
| Be/Co/P/O | Fe/Sn/P/O |
| Bi/Co/P/O | Fe/Sn/O |
| Bi/Sn/P/O | Hg/Sn/P/O |
| Ca/Co/P/O | Mg/Ni/Sn/O |
| Cd/Co/P/O | Mg/Ni/S/O |
| Cd/Sn/P/O | Mo/Ni/P/O |
| Co/Fe/P/O | Mo/Ni/Sb/O |
| Co/Fe/Sb/O | Mo/Sn/P/O |
| Co/In/P/O | Ni/Sn/O |
| Co/Mg/O | Sc/Sn/P/O |
| Co/Mg/Ni/P/O | Sn/W/P/O |
| Co/Mg/P/O | Sn/Zn/P/O | and the like and mixtures thereof.

Particularly preferred are the catalysts represented by the expression Me/P/O. Some specific examples of such preferred catalysts include:

| | |
|---|---|
| Li/Sn/P/O | Fe/P/O |
| Na/Sn/P/O | Li/Fe/P/O |
| K/Sn/P/O | K/Fe/P/O |
| Ni/Sn/P/O | Al/Fe/P/O |
| K/Ni/Sn/P/O | Co/Fe/P/O |
| Sb/Ni/Sn/P/O | Bi/Co/P/O |
| K/Sb/Ni/Sn/P/O | |

The catalysts can be prepared by any suitable method. Methods such as coprecipitation, impregnation, wet mixing, dry mixing, and the like can be used. Any procedure or sequence of steps which can provide a calcined intimate mixture of the desired elements in the desired proportions and having a catalytic surface area of at least 1 m.²/g. can be used.

If desired, the catalytic compositions can be supported on or diluted with suitable catalyst support materials such as silica, alumina, magnesia, titania, zirconia, or combinations thereof, as well as other similar materials known in the art. The catalysts can be in the form of granules, pellets, tablets, powder or other conventional form.

Before use in the reaction zone, the intimate mixture of catalytic ingredients is subjected to a calcination in air, or in air and steam, at temperatures in the range of about 900° to about 1500° F. for from about 0.1 to about 25 hours, preferably a temperature in the range of about 1100° to about 1300° F. for from about 1 to about 10 hours to form the catalyst composition.

In accordance with the present invention, the sulfur or thermally-decomposable sulfur-containing compounds are introduced into the reaction zone, preferably in admixture with the feedstock. The amount of sulfur or thermally-decomposable sulfur-containing compounds which is introduced into the reaction zone should be such as to provide from about 1 to about 20,000 p.p.m. sulfur, based on weight of feedstock, in the reaction zone. Preferably, about 1 to about 10,000 p.p.m. sulfur, based on weight of feedstock, is added to the reaction zone in admixture with the feed using compounds such as carbon disulfide, sulfur dioxide, hydrogen sulfide, mercaptans, organic disulfides, thiophene, and the like, including mixtures thereof. Good results are obtained by adding from about 1 to about 1,000 p.p.m. sulfur and beneficial results can be obtained with 50 to 500 p.p.m. sulfur.

The organic feedstocks which can be dehydrogenated in accordance with the present invention are dehydrogenatable organic compounds characterized by having at least one

grouping, i.e., adjacent carbon atoms having at least one hydrogen atom. Particularly applicable are dehydrogenatable hydrocarbons having from 3 to 10 carbon atoms per molecule. These can be paraffinic or monoolefinic, cyclic or acyclic, branched or unbranched. Some examples of such applicable hydrocarbon feedstocks are $n$-butenes, $n$-pentenes, isopentenes, $n$-butane, isopentane, octenes, octanes, decenes, decanes, cyclobutene, cyclopentane, cyclohexene, 3-isobutylcyclopentene, and the like, including mixtures thereof. Particularly appropriate is the conversion of normal butane or butenes to dehydrogenation products including butadiene.

Generally, at least trace amounts of oxygenated products are also formed in these reactions. For example, compounds such as furan and acetaldehyde are obtained from the conversion of butenes. Similarly, compounds such as furfural, acetaldehyde and acetic acid are obtained from the conversion of pentenes.

The processes of this invention are ordinarily carried out by forming a mixture, preferably a preheated mixture, of the sulfur-containing material, organic feedstock, steam, and oxygen or an oxygen-containing gas such as air, and passing this mixture into contact with the catalyst at the desired temperature and pressure. Air is generally the most preferred oxygen-containing gas. Any suitable mode of contact using any suitable type of reactor can be used for the dehydrogenation. A fixed bed method of operation is presently preferred although fluidized or moving beds can be used if desired.

In the reaction zone, the temperature will generally be in the range of about 800° to about 1300° F., preferably in the range of about 900° to about 1150° F. The pressure can be in the range of from about 0.05 to about 250 p.s.i.a., and preferably in the range from about 0.1 to about 25 p.s.i.a.

The volumetric oxygen:organic feed ratio can be in the range of from about 0.1:1 to about 3:1, preferably in the range from about 0.5:1 to about 2:1. The amount of steam will generally be such as to provide a volumetric steam:organic feed ratio in the range of about 0.1:1 to about 100:1, preferably 5:1 to about 20:1. Generally, the processes operate at a gaseous hourly space velocity (GHSV) of the organic feed in a range of from about 50 to about 5,000, preferably about 100 to about 2,500, volumes of organic vapor per volume of catalyst per hour.

The catalysts of the invention can be used for long periods without reactivation. However, when and if the activation becomes necessary, it can be effected by simply stopping the flow of organic feed and allowing the flow of the other components of the feed mixture, i.e., the air and steam, to continue for a suitable reactivation time or until the activity is substantially restored.

The following examples will serve to further illustrate this invention.

EXAMPLE I

In this example, normal butenes were oxidatively dehydrogenated over a Li/Sn/P/Q catalyst in a series of runs in which varying amounts of a sulfur compound were introduced into the reaction zone by being premixed with the feed. The catalyst was a calcined Sn/P/O composition which contained about 10 weight percent phosphorus and which had then been impregnated with a lithium compound to contain about 1.5 weight percent lithium after a final calcination. The catalyst was a commercial product in the form of ⅛ inch x ⅛ inch tablets.

A mixture of normal butenes, air and steam were preheated and passed over a fixed bed of this catalyst. Varying amounts of carbon disulfide were blended with the feed. The tubular reactors were operated continuously and samples of the effluents were taken after 3 hours on-stream and after 12 hours on-stream. The results of these tests, together with the essential reaction conditions, are shown in Table I below.

TABLE I

Oxidative Dehydrogenation of Butenes to Butadiene

| Run | S, p.p.m. | 3 hours [1] | | | 12 hours [1] | | |
|---|---|---|---|---|---|---|---|
| | | Conv., percent | Yield [2] | Modivity [3] | Conv., percent | Yield [2] | Modivity [3] |
| 1 | 0 | 60 | 56 | 94 | 60 | 53 | 88 |
| 2 | 100 | 45 | 44 | 97 | 50 | 48 | 96 |
| 3 | 500 | 46 | 44 | 96 | 50 | 47 | 94 |
| 4 | 1,000 | 45 | 43 | 97 | 52 | 49 | 94 |

[1] At 1,000° F., atmospheric pressure, 300 butenes GHSV, 264 O₂ GHSV, and steam/butenes volumetric ratio of 18.2–19.0.
[2] In moles butadiene per 100 moles butenes fed.
[3] Modified selectivity based on analysis of gas phase products which include carbon oxides, cracked products, butadiene, and unconverted feed.

The data in Table I show the beneficial effects of adding small quantities of sulfur into the reaction zone. Comparing the results of each of the runs sampled after 3 hours, one sees that the presence of sulfur enhances the modivity (modified selectivity) of the reaction.

However, comparing the results obtained after 3 hours with the results obtained after 12 hours on-stream illustrates a still greater advantage. In the absence of added sulfur, the yield and modivity were seen to decrease. With added sulfur, on the other hand, the conversion increased significantly. While the modivity fell off to some degree, the level was still sufficiently high that the yield of desired product in the sulfur-containing runs was also improved with the greater time on-stream. Thus, the presence of the sulfur improves the effective life of the catalyst in the process.

Still another advantage of the present invention process is that somewhat less steam can be used without sacrifice of selectivity. Besides moderating the heat of reaction, the presence of substantial amounts of steam is necessary to maintain optimum selectivity. In Table II below, two runs are compared in which the steam/butene ratio are different. The samples were taken after 60 hours on-stream. Other than that, the conditions are the same as in Table I.

TABLE II

| | | |
|---|---|---|
| Sulfur added (p.p.m. $CS_2$) | 0 | 100 |
| Conversion | 58 | 61 |
| Yield | 49 | 52 |
| Modivity | 85 | 85 |
| Steam/butenes ratio | 18.2/1 | 14.4/1 |

The data in Table II show that the invention process can operate with a reduced steam usage and still sustain a high modivity level. The conversion and yield are also seen to be improved.

EXAMPLE II

In this example, normal butane was oxidatively dehydrogenated to butene and butadiene over a Ni/Sn/P/O catalyst in a series of runs with varying amounts of added sulfur. The catalyst was prepared by coprecipitation of nickel sulfate and potassium stannate using potassium hydroxide followed by filtration, washing, and incorporation of phosphoric acid. The finished catalyst, in the form of 20–40 mesh granules, contained 47% Ni, 9.3% Sn, 5.3% P, 5.3% S, 1.8% K, and had a surface area of 50 m.$^2$/g. The Ni:Sn molar ratio was about 10:1.

A mixture of normal butane, steam, and air was preheated and passed over a fixed bed of this catalyst. $CS_2$ was added to the feed. The tubular reactors were operated continuously under several combinations of operating conditions. After 3 hours on-stream, the effluent was sampled and analyzed by gas-liquid chromatography. The results of these tests, together with the essential reaction conditions, are shown in Table III below.

EXAMPLE III

In a manner similar to that of Example II, several Ni/Sn/P/O catalysts, additionally containing minor amounts of potassium and combined sulfur in some instances, were prepared with varied proportions of the ingredient metals. These catalysts were then tested for the oxidative dehydrogenation of butane, in a manner also similar to that of Example II, both in the presence and absence of small amounts of sulfur compound ($CS_2$). The results of these tests, as well as the essential conditions, are shown in Table IV below.

TABLE IV
Oxidative Dehydrogenation of Butane to Butenes and Butadiene

| | Molar | Weight percent | | | | | S, | Conv.,[1] | Modiv- | Yield [3] | |
| Run | Ni:Sn | Ni | Sn | P | K | S | p.p.m., in feed | percent | ity,[2] total | Buta- diene | Butenes |
|---|---|---|---|---|---|---|---|---|---|---|---|
| 1 | 5:1 | 48 | 17 | 3.9 | 1.3 | 0 | 100 | 50 | 70 | 23 | 12 |
| 2 | 5:1 | 48 | 17 | 3.9 | 1.3 | 0 | 0 | 49 | 70 | 23 | 12 |
| 3 | 19:1 | 58 | 5.9 | 6.4 | 1.3 | 0 | 100 | 32 | 81 | 13 | 13 |
| 4 | 19:1 | 58 | 5.9 | 6.4 | 1.3 | 0 | 0 | 34 | 82 | 15 | 13 |
| 5 | 5:1 | 41 | 14 | 4 | 1.1 | 5 | 100 | 44 | 70 | 14 | 17 |
| 6 | 5:1 | 41 | 14 | 4 | 1.1 | 5 | 0 | 48 | 70 | 17 | 16 |
| 7 | 10:1 | 46 | 9.6 | 4.9 | 1.7 | 4.9 | 100 | 37 | 84 | 17 | 14 |
| 8 | 10:1 | 46 | 9.6 | 4.9 | 1.7 | 4.9 | 0 | 39 | 83 | 19 | 13 |
| 9 | 19:1 | 54 | 5.6 | 5.0 | 1.7 | 5 | 100 | 41 | 72 | 20 | 10 |
| 10 | 19:1 | 54 | 5.6 | 5.0 | 1.7 | 5 | 0 | 42 | 69 | 20 | 9 |

[1] At 1,075° F., atmospheric pressure, 100 butane GHSV, at a $O_2/C_4/H_2O$, volumetric ratio of 1.2/1.0/10, and after 20 hours on-stream.
[2] Modified selectivity (as defined in Ex. I) to both butenes and butadiene.
[3] In moles per 100 moles butane fed.

The data in Table IV indicate that, under these conditions, butane feed is perhaps less responsive to the invention process than olefinic feeds such as butenes. Similarly, the data indicate that the Ni/Sn/P/O catalysts with lower Ni:Sn ratios are probably more responsive than those with higher ratios.

Reasonable variations and modifications are possible within the scope of this disclosure without departing from the spirit and scope thereof.

I claim:

1. In a process for the oxidative dehydrogenation of a dehydrogenatable hydrocarbon feedstock having 3 to 10 carbon atoms per molecule in the presence of an oxidative dehydrogenation catalyst consisting essentially of Li, Sn, P and O, the improvement which comprises effecting said dehydrogenation in the presence of about 1 to about 20,000 p.pm., based on weight of feedstock, of carbon disulfide.

2. In a process for the oxidative dehydrogenation of a dehydrogenatable hydrocarbon feedstock having 3 to 10 carbon atoms per molecule in the presence of an oxidative dehydrogenation catalyst consisting essentially of K, Ni, Sn, P and O, the improvement which comprises ef- TABLE III
Oxidative Dehydrogenation of Butane to Butenes and Butadiene

| Run | S, p.p.m. | GHSV butane | $O_2/C_4$ | $H_2O/C_4$ | Conv., percent [1] | Butenes plus butadiene yield [2] | Buta- diene yield [3] | Total modiv- ity [4] |
|---|---|---|---|---|---|---|---|---|
| 1 | 5,000 | 250 | 1.2 | 10.0 | 40.6 | 26.1 | 21.2 | 64.3 |
| 2 | 0 | 250 | 1.2 | 10.0 | 48.2 | 20.6 | 25.3 | 63.5 |
| 3 | 5,000 | 500 | 1.2 | 7.1 | 46.0 | 27.6 | 19.4 | 60.0 |
| 4 | 0 | 500 | 1.2 | 7.1 | 59.5 | 31.5 | 25.3 | 53.1 |
| 5 | 5,000 | 500 | 3.0 | 7.1 | 37.8 | 31.1 | 22.0 | 82.2 |
| 6 | 0 | 500 | 3.0 | 7.1 | 57.2 | 33.5 | 25.8 | 58.5 |

[1] At 1,100° F. and atmospheric pressure, and after 3 hours on-stream.
[2] In moles butenes plus butadiene per 100 moles butane fed.
[3] In moles butadiene per 100 moles butane fed.
[4] Modified selectivity (as defined in Ex. I) to both butenes and butadiene.

The data in the table above indicate that the presence of sulfur in the reaction improves the selectivity to total dehydrogenation products.

fecting said dehydrogenation in the presence of about 1 to about 20,000 p.p.m., based on weight of feedstock of carbon disulfide.

3. The process of claim 2 wherein said catalyst has additionally incorporated therein sulfur.

References Cited

UNITED STATES PATENTS

| | | | |
|---|---|---|---|
| 3,708,550 | 1/1973 | Beuther et al. | 260—680 |
| 3,666,687 | 5/1972 | Croce et al. | 260—680 |
| 3,308,185 | 3/1967 | Bajars | 260—680 |
| 3,590,090 | 6/1971 | Cohen et al. | 260—680 |
| 3,647,910 | 3/1972 | Jones et al. | 260—683.3 |
| 3,681,258 | 8/1972 | Pitzer | 252—437 |
| 3,687,868 | 8/1972 | Pitzer | 260—680 E |

FOREIGN PATENTS

| | | | |
|---|---|---|---|
| 984,901 | 3/1965 | Great Britain | 260—680 E |

PAUL M. COUGHLAN, Jr., Primary Examiner

U.S. Cl. X.R.

252—437; 260—683.3